United States Patent
Enami et al.

(10) Patent No.: US 8,587,843 B2
(45) Date of Patent: Nov. 19, 2013

(54) APPARATUS AND A METHOD FOR CONTROLLING A LIGHT SOURCE USED FOR IMAGE READING

(75) Inventors: Takashi Enami, Chigasaki (JP); Toyonori Shiho, Tokyo (JP); Hiroaki Umezawa, Kamakura (JP)

(73) Assignee: Ricoh Company, Ltd., Tokyo (JP)

( * ) Notice: Subject to any disclaimer, the term of this patent is extended or adjusted under 35 U.S.C. 154(b) by 1520 days.

(21) Appl. No.: 12/149,697

(22) Filed: May 7, 2008

(65) Prior Publication Data

US 2008/0278774 A1    Nov. 13, 2008

(30) Foreign Application Priority Data

May 7, 2007  (JP) .................................. 2007-122128
May 2, 2008  (JP) .................................. 2008-120197

(51) Int. Cl.
H04N 1/04    (2006.01)

(52) U.S. Cl.
USPC ........... 358/475; 358/486; 358/474; 358/509; 358/505

(58) Field of Classification Search
None
See application file for complete search history.

(56) References Cited

U.S. PATENT DOCUMENTS

| | | | |
|---|---|---|---|
| 5,900,950 A * | 5/1999 | Hsu | 358/497 |
| 6,316,767 B1 * | 11/2001 | Paxton et al. | 250/234 |
| 2004/0101325 A1 * | 5/2004 | Choi | 399/75 |
| 2006/0208157 A1 * | 9/2006 | Michiie | 250/208.1 |

FOREIGN PATENT DOCUMENTS

| | | |
|---|---|---|
| JP | 03-204266 | 9/1991 |
| JP | 05-199338 | 8/1993 |
| JP | 07072684 A * | 3/1995 |
| JP | 07-273951 | 10/1995 |
| JP | 11-122441 | 4/1999 |
| JP | 11-308386 | 11/1999 |
| JP | 2000-151919 | 5/2000 |
| JP | 2001-290226 | 10/2001 |
| JP | 2005-182071 | 7/2005 |
| JP | 2006-005964 | 1/2006 |
| JP | 2006-287975 | 10/2006 |

OTHER PUBLICATIONS

Office Action for corresponding Japanese patent application No. 2008-120197 issued on Feb. 22, 2012.

* cited by examiner

*Primary Examiner* — Cheukfan Lee
(74) *Attorney, Agent, or Firm* — Harness, Dickey & Pierce, P.L.C.

(57) ABSTRACT

An apparatus and a method for controlling a light source used for image reading according to a user activity are provided. The light source controller being coupled to a light source and configured to change the power of the light source from an OFF state to an ON state when a user activity signal having a first state is output, the user activity signal having the first state being assumed to be output when a user activity, other than an instruction to begin scanning, that is assumed to ultimately cause output of the image reading start signal has been performed on the image reading apparatus.

20 Claims, 7 Drawing Sheets

APPARATUS AND A METHOD FOR CONTROLLING A LIGHT SOURCE USED FOR IMAGE READING

CROSS-REFERENCE TO RELATED APPLICATIONS

This patent application is based on and claims priority under 35 U.S.C. §119 to Japanese Patent Application Nos. 2007-122128 filed on May 7, 2007, and 2008-120197 filed on May 2, 2008, in the Japanese Patent Office, the entire contents of which are hereby incorporated by reference.

FIELD OF THE INVENTION

Example embodiments of the present invention relate generally to an apparatus and a method for controlling a light source used for image reading according to a user activity.

BACKGROUND

An image reading apparatus may be provided, which reads an original document into image data by converting a light reflected from the original document into an image signal. In order to cause the image reading apparatus to read the original document into image data, a user inputs a user instruction for starting image reading through a user interface such as an operation panel. However, the image reading apparatus is not able to promptly start image reading even when the apparatus has been turned on. The image reading apparatus may need to wait until it becomes ready for image reading, thus increasing the overall time that may be necessary for image reading.

SUMMARY

In order to reduce the overall time for image reading, the inventors of the present invention have observed that a light source, which is provided in the image reading apparatus, may need to be turned on before the user instruction is input by the user. To read the original document into image data, the image reading apparatus firstly causes the light source to irradiate a light to the original document. However, when the image reading apparatus is not in use at least for a predetermined time period, the light source is usually turned off to conserve energy. When the user inputs the user instruction for starting image reading, the light source is turned on to prepare for image reading. In order to be able to read the original document, the image reading apparatus may need to wait until the light source becomes ready for image reading.

In view of the above, example embodiments of the present invention include an image reading apparatus capable of controlling a light source according to a user activity that is assumed to ultimately cause image reading. For example, the image reading apparatus includes a light source to irradiate a light to an original document when the power of the light source is in an on state, an imaging device to convert a light reflected from the original document to an image signal when an image reading start signal is output, an operation controller to change the power of the light source from an off state to the on state when the image reading start signal is output, and a light source controller to change the power of the light source from the off state to the on state when a user activity signal having a first state is output. The user activity signal having the first state is assumed to be output when a user activity that is assumed to ultimately cause output of the image reading stat signal has been performed on the image reading apparatus.

Other example embodiments of the present invention include an image reading apparatus capable of controlling a light source according to a user activity that is assumed to ultimately cause cancellation of image reading. For example, the image reading apparatus includes a light source to irradiate a light to an original document when the power of the light source is in an on state, an imaging device to convert a light reflected from the original document to an image signal when an image reading start signal is output, an operation controller to change the power of the light source from an off state to the on state when the image reading start signal is output, and a light source controller to change the power of the light source from the on state to the off state when a user activity having a second state is output. The user activity signal having the second state is assumed to be output when a user activity that is assumed to ultimately cause cancellation of the image reading start signal has been performed on the image reading apparatus.

Other example embodiments of the present invention include an image forming apparatus capable of controlling a light source according to a user activity. For example, the image forming apparatus includes a light source to irradiate a light to an original document when the power of the light source is in an on state, an imaging device to convert a light reflected from the original document to an image signal when an image reading start signal is output, a printing device to form an image on a recording sheet according to the image signal, an operation controller to change the power of the light source from the off state to the on state when the image reading start signal is output, and a light source controller to change the power of the light source from the off state to the on state when a user activity signal having a first state is output. The user activity signal having the first state is assumed to be output when a user activity that is assumed to ultimately cause output of the image reading start signal has been performed on the image forming apparatus.

Other example embodiments of the present invention include an image forming apparatus capable of controlling a light source according to a user activity that is assumed to ultimately cause cancellation of image reading. For example, the image forming apparatus includes a light source to irradiate a light to an original document when the power of the light source is in an on state, an imaging device to convert a light reflected from the original document to an image signal when an image reading start signal is output, a printing device to form an image on a recording sheet according to the image signal, an operation controller to change the power of the light source from the off state to the on state when the image reading start signal is output, and a light source controller to change the power of the light source from the on state to the off state when a user activity signal having a second state is output. The user activity signal having the second state is assumed to be output when a user activity that is assumed to ultimately cause cancellation of the image reading start signal has been performed on the image forming apparatus.

Other example embodiments of the present invention include a method of controlling a light source used for image reading according to a user activity that is assumed to ultimately cause image reading. For example, the light source controlling method includes: irradiating a light to an original document when the power of the light source is in an on state; converting a light reflected from the original document to an image signal when an image reading start signal is output; changing the power of the light source from an off state to the on state when the image reading start signal is output; and changing the power of the light source from the off state to the on state when a user activity signal having a first state is output. The user activity signal having the first state is assumed to be output when a user activity that is assumed to ultimately cause output of the image reading start signal has been performed.

Other example embodiments of the present invention include a method of controlling a light source used for image reading according to a user activity that is assumed to ultimately cause cancellation of image reading. For example, the light source controlling method includes: irradiating a light to an original document when the power of the light source is in an on state; converting a light reflected from the original document to an image signal when an image reading start signal is output; changing the power of the light source from an off state to the on state when the image reading start signal is output; and changing the power of the light source from the on state to the off state when a user activity signal having a second state is output. The user activity signal having the second state is assumed to be output when a user activity that is assumed to ultimately cause cancellation of the image reading start signal has been performed.

In addition to the above-described example embodiments, the present invention may be practiced in various other ways, for example, as a system or a computer program product each capable of controlling a light source used for image reading according to a user activity.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 1:
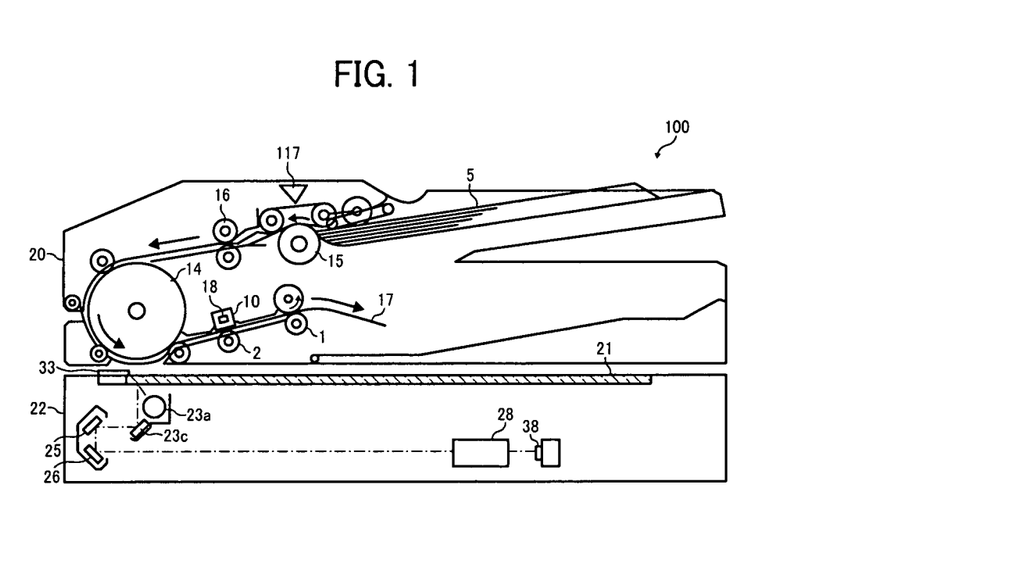
FIG. 1 is a cross-section view illustrating the structure of an image reading device provided with an automatic document feeder according to an example embodiment of the present invention.

Referring now to the drawings, wherein like reference numerals designate identical or corresponding parts throughout the several views, FIG. 1 illustrates an image reading apparatus 100 according to an example embodiment of the present invention.

The image reading apparatus 100 includes an automatic document feeder (ADF) 20 and an image reading device 22. In this example, the image reading apparatus 100 is capable of controlling a light source, which may be provided in the image reading device 22 and/or the ADF 20, according to a user activity being performed on the image reading device 22 and/or the ADF 20. For example, when the image reading apparatus 100 assumes that the user activity being performed will ultimately cause the image reading device 22 to start image reading, the image reading apparatus 100 causes the light source to change from the off state to the on state. Since the light source has been already turned on by the time when the image reading apparatus 100 receives a user instruction for starting image reading, the image reading apparatus 100 may promptly start reading an original document into image data when the user instruction is received.

Still referring to FIG. 1, the ADF 20, which is provided on a top surface of the image reading device 22, includes a document tray 5, a document set detector 117, a plurality of rollers including such as a feed roller 15, a first transfer roller 16, a second transfer roller 14, a third transfer roller 2, and a discharge roller 1, a discharge tray 17, and a first imaging sensor 10 provided with a first light 18.

The plurality of rollers, some of which may be driven by a drive device, feeds and transfers the original document from the document tray 5 to the discharge tray 17 under control of a controller, which may be provided in the ADF 20 or the image reading device 22. In this example, as described below referring to FIG. 5, the system controller 110 may control transfer operation performed by the plurality of rollers of the ADF 20 via the drive device of the ADF 20.

The document set detector 117, which is capable of detecting whether an original document is placed on the document tray 5, may be implemented by any desired sensor, such as a photo-interruptive sensor or a pressure sensor. In order to detect the original document, the document set detector 117 may be provided at a position such that the leading edge of the original document being placed on the document tray 5 can be detected. In this example, the document set detector 117 monitors whether the original document is placed on the document tray 5. For example, when no original document is detected to be placed on the document tray 5, the document set detector 117 outputs a document set detection signal having the "OFF" state, which indicates that no original document is set. When the original document is detected to be placed on the document tray 5, the document set detector 117 outputs the document set detection signal having the "ON"

state, which indicates that the original document is set. When the document set detection signal having the "ON" state is output, the system controller 110 of the image reading device 22 may cause the ADF 20 to feed the original document, for example, by activating the drive device that drives the plurality of rollers.

The first imaging sensor 10 may be implemented by any desired photo-electric converter, such as a contact imaging sensor (CIS). The first light 18 may be implemented by any desired light source, such as a light emitting diode (LED).

In an example embodiment, the ADF 20 feeds the original document, which is placed on the document tray 5, toward an exposure glass 21 of the image reading device 22, and further to the discharge tray 17, as indicated by the arrows shown in FIG. 1. For example, when the document set detector 117 detects that the original document is placed on the document tray 5, the document set detector 117 outputs the document set detection signal indicating that the original document is set. As the document set detection signal is output, the system controller 110 (FIG. 5) activates the drive device of the ADF 20 to cause the plurality of rollers to rotate. Accordingly, the original document placed onto the document tray 5 is fed, one sheet by one sheet, by the feed roller 15, and transferred by the plurality of transfer rollers including the first transfer roller 16 and the second transfer roller 14 toward the discharge tray 17 via an image reading section where one side of the original document facing the image reading device 22 is read by the image reading device 22. In this manner, the entire section of the original document may be read by the image reading device 22 at the image reading section as the original document is being transferred from the document tray 5 to the image reading section. After being read by the image reading device 22, the original document is fed by the third transfer roller 2, and discharged by the discharge roller 1 onto the discharge tray 17.

Figure 2:
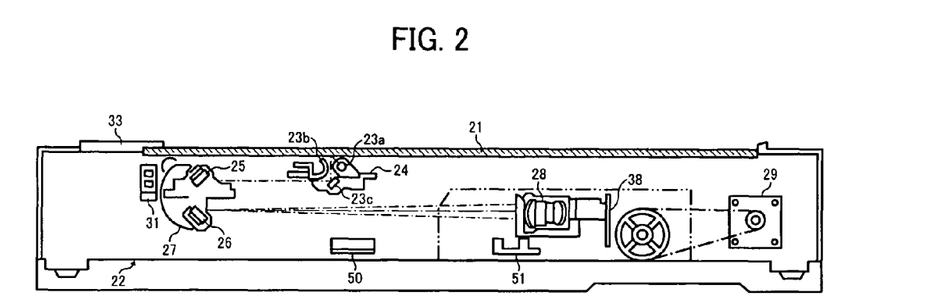
FIG. 2 is an enlarged cross-section view illustrating the structure of the image reading device shown in FIG. 1 according to an example embodiment of the present invention.
Figure 3:
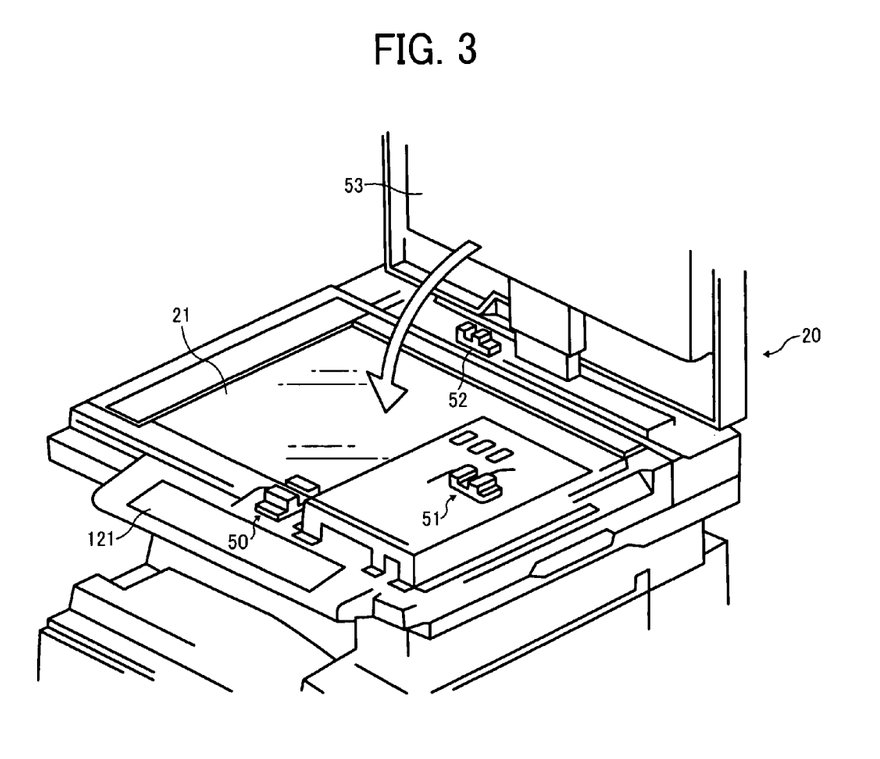
FIG. 3 is a perspective view illustrating the outer appearance of a top surface of the image reading device shown in FIG. 1 according to an example embodiment of the present invention.
Figure 5:
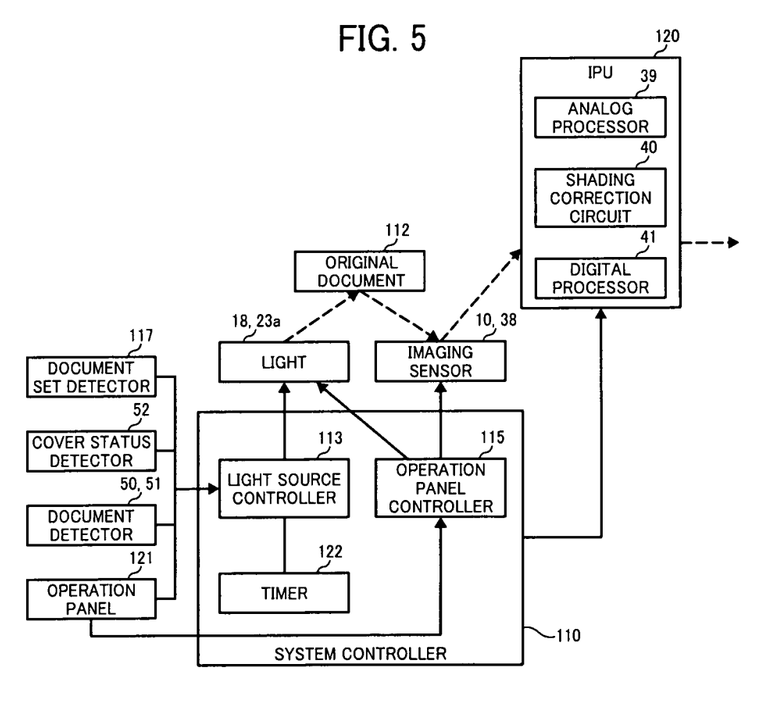
FIG. 5 is a schematic block diagram illustrating the functional structure of a portion of the image reading device shown in FIG. 1 according to an example embodiment of the present invention.

Referring to FIGS. 1 and 2, the image reading device 22 includes the exposure glass 21, a first carriage 24 including a second light 23a, a reflector 23b, and a first mirror 23c, a second carriage 27 including a second mirror 25 and a third mirror 26, an imaging lens 28, a motor 29, a home position (HP) sensor 31, a reference board 33, a second imaging sensor 38, a first document detector 50, and a second document detector 51. Further, as shown in FIG. 3, the image reading device 22 may be provided with a cover status detector 52, and an operation panel 121. Further, as shown in FIG. 5, the image reading device 22 is provided with the system controller 110 and an image processing unit (IPU) 120. Additionally, the image reading device 22 may be provided with a communication device, which allows the image reading device 22 to communicate with another device through a communication line or a network. Additionally, the image reading device 22 may be provided with an input/output port, which allows the image reading device 22 to read data from a storage medium or write data onto the storage medium.

Referring back to FIGS. 1 and 2, the first carriage 24 and the second carriage 27 may be driven by a drive device such as the motor 29 to move respectively in the sub-scanning direction and the main scanning direction. The second light 23a may be implemented by any desired light source, such as a xenon lamp or a fluorescent lamp. The HP sensor 31, which is provided at a predetermined position of the image reading device 22, may be implemented by a reflective or transmittive photo-interruptive sensor. The reference board 33 may be used to generate shading correction data, as described below referring to FIG. 5. The second imaging sensor 38 may be implemented by any desired photo-electric converter, such as a charged couple device (CCD) or a CIS. However, when the CIS is used as the second imaging sensor 38, the structure of the image reading device may be made differently from the structure shown in FIG. 2. The first document detector 50 and the second document detector 51 are provided respectively at a lower section of the image reading device 22 below the exposure glass 21.

As described above referring to FIG. 1, the image reading device 22 may read the original document fed by the ADF 20 into image data. In such case, the image reading device 22 reads the original document at the image reading section where one side of the original document faces the exposure glass 21 of the image reading device 22, as the original document is transferred by the ADF 20. The first carriage 24 and the second carriage 27 each stay at the predetermined position so that the second light 23a can irradiate a light toward the original document at the image reading section. The light reflected from the original document is reflected by the reflector 23b to the first mirror 23c. The light received by the first mirror 23c is directed toward the imaging lens 28 by the second mirror 25 and the third mirror 26. The imaging lens 28 forms an optical image on a surface of the second imaging sensor 38. The second imaging sensor 38 converts the optical image to image data, i.e., an image signal, and provides the image data to the IPU 120 (FIG. 5) for further processing. The above-described operation of image reading is performed under control of the system controller 110 (FIG. 5).

When both sides of the original document are to be read, one side of the original document facing the exposure glass 21 of the image reading device 22 may be read by the second imaging sensor 38 as described above. Further, the other side of the original document may be read by the first imaging sensor 10. In order to read the other side of the original document, the first light 18 irradiates a light to the other side of the original document when the original document passes through a nip formed between the first imaging sensor 10 and the third transfer roller 2. The light reflected from the other side of the original document is converted by the first imaging sensor 10 to an image signal for further processing by the IPU 120 (FIG. 5). The above-described operation of image reading is performed under control of the system controller (FIG. 5).

The system controller 110 may be implemented by any desired processor such as a central processing unit (CPU) provided with a memory. Examples of the memory include, but not limited to, a read only memory (ROM), a random access memory (RAM), and a non-volatile RAM (NVRAM). For example, a reading control program may be stored in the ROM. When activated by the CPU, the reading control program causes the CPU to perform image reading according to the reading control program. Alternatively, the reading control program may be downloaded from the outside of the image reading device through the communication line or the network, if the communication device is provided. Alternatively, the reading control program may be read from any desired storage medium through the input/output port, if the input/output port is provided.

The IPU 120 performs image processing, such as pre-scan image processing, on the image signal output by the first imaging sensor 10 or the second imaging sensor 38. For example, as shown in FIG. 5, the IPU 120 includes an analog processor 39, a shading correction circuit 40, and a digital processor 41. The analog processor 39 converts the image signal output by the first imaging sensor 10 or the second imaging sensor 38 from analog to digital.

The shading correction circuit 40 performs shading correction on the image signal output by the analog processor 39, for example, to compensate for lighting spatial non-uniformity of the first light 18 or the second light 23a, lens defects of the second imaging lens 28, or sensor response defects of the first imaging sensor 10 or the second imaging sensor 38. For example, the second imaging sensor 38 may obtain the shading correction data by converting the light reflected from the reference board 33. Using the shading correction data, the shading correction circuit 40 may correct the image signal received from the analog processor 39. In another example, the shading correction data may be obtained by the first imaging sensor 10 by converting the light reflected from a background board when no original document passes through the nip formed between the first imaging sensor 10 and the third transfer roller 2. The shading correction data may be obtained each time before reading the original document. Alternatively, the shading correction data may be stored in the memory of the system controller 110.

The digital processor 41 may perform various image processing including magnification processing, gamma conversion, or color conversion, on the image signal output by the shading correction circuit 40. The image data processed by the IPU 120 may be stored in a memory such as the memory of the system controller 110. Alternatively, the image data may be output to another unit or device, which may be provided with the image reading apparatus 100, for example, to a printing apparatus as described below with reference to FIG. 7.

Alternatively, the image reading device 22 may read the original document, which is placed onto the exposure glass 21, into image data. For example, as shown in FIG. 3, the ADF 20 may be opened to allow the user to place the original document directly onto the exposure glass 21. When the ADF 20 is closed as indicated by the arrow of FIG. 3, a lower section 53 of the ADF 20 presses the original document against the exposure glass 21 to tightly fix the position of the original document. To read the original document, the second light 23a irradiates a light toward the original document. When reading the original document placed on the exposure glass 21, the second light 23a, the reflector 23b, and the first mirror 23c, all of which may be incorporated into the first carriage 24, are driven by the motor 29 in the subscanning direction to be away from the home position that may be determined by the HP sensor 31. The second mirror 25 and the third mirror 26, both of which may be incorporated into the second carriage 27, are driven by the motor 29 in the main scanning direction to be away from the home position that may be determined by the HP sensor 31. With this scanning operation, the entire portion of the original document being placed on the exposure glass 21 may be read, line by line. The light reflected from the original document is directed toward the imaging lens 28 by the first mirror 23c, the second mirror 25, and the third mirror 26. The second imaging sensor 38 converts an optical image, which is formed on its surface by the imaging lens 28, to image data, i.e., an image signal for further processing by the IPU 120 (FIG. 5). When the entire section of the original document is read, the first carriage 24 and the second carriage 27 are returned to the respective home positions. The above-described operation of image reading is performed under control of the system controller 110 (FIG. 5).

Referring now to FIG. 3, the cover status detector 52, which is capable of detecting whether the lower section 53 of the ADF 20 is open or closed, may be provided on the top surface of the image reading device 22. For example, as shown in FIG. 3, the cover status detector 52 may be provided at a location near the rotation center axis of the ADF 20. The cover status detector 52 may be implemented by any desired sensor, such as a reflective or transmittive photo-interruptive sensor. In this example, the cover status detector 52 monitors the status of the ADF 20 to output a cover status detection signal indicating whether the ADF 20 is open or closed. For example, when opening of the ADF 20 is detected, the cover status detector 52 outputs the cover status detection signal having the "OFF" state to indicate that the ADF 20 is open. When closing of the ADF 20 is detected, the cover status detector 52 outputs the cover status detection signal having the "ON" state to indicate that the ADF 20 is closed. When the cover status detection signal having the "OFF" state is output, or when the cover status detection signal is changed from the "ON" state to the "OFF" state, the system controller 110 (FIG. 5) causes the image reading device 22 to interrupt image reading operation. In such case, the system controller 110 may report to the user that the ADF 20 is open via the operation panel 121.

The first document detector 50 and the second document detector 51 may each detect whether the original document is placed on the exposure glass 21. The first document detector 50 and the second document detector 51 may each be implemented by any desired sensor, such as a reflective photo-interruptive sensor. In this example, the first document detector 50 and the second document detector 51 each monitor whether any original document is placed on the exposure glass 21. For example, when either one of the document detectors 50 and 51 detects that no original document is placed on the exposure glass 21, the document detector 50 or 51 outputs a document detection signal having the "OFF" state to indicate that no original document is placed on the exposure glass 21. When either one of the document detectors 50 and 51 detects that the original document is placed on the exposure glass 21, the document detector 50 or 51 outputs the document detection signal having the "ON" state to indicate that the original document is placed on the exposure glass. When the detection signal having the "OFF" state is output, or when the detection signal is changed from the "ON" state to the "OFF" state, the system controller 110 (FIG. 5) causes the image reading device 22 to interrupt image reading operation even though the cover status detector 52 outputs the cover status detection signal indicating that the ADF 20 is closed. In such case, the system controller 110 may report to the user that the original document is not provided via the operation panel 121.

Additionally or alternatively, the first document detector 50 and the second document detector 51 may each detect whether the ADF 20 is open or closed, for example, by monitoring whether the lower section 53 of the ADF 20 is located away from the exposure glass 21. Preferably, in this example, the first document detector 50 may be provided at a location away from the rotation center axis of the ADF 20 as shown in FIG. 3. By providing the first document detector 50 at such location, opening of the ADF 20 may be detected by the first document detector 50 even when the cover status detector 52 is unable to detect opening of the ADF 20. For example, when the first document detector 50 detects that the ADF 20 is open, the first document detector 50 outputs a document detection signal having the "OFF" state to indicate that the ADF 20 is open. When the document detection signal having the "OFF" state is output, or when the document detection signal is changed from the "ON" state to the "OFF" state, the system controller 110 (FIG. 5) causes the image reading device 22 to interrupt image reading operation even through the cover status detector 52 outputs the cover status detection signal indicating that the ADF 20 is closed.

Additionally, the first document detector 50 and the second document detector 51 may be used to detect the size and/or orientation of the original document being placed on the exposure glass 21. For example, when the document detection signal having the "ON" state is output, the system controller 110 (FIG. 5) may obtain information regarding the size and/or orientation of the original document from the document detectors 50 and 51. Alternatively, the system controller 110 may obtain information regarding the size and/or orientation of the original document from the document detectors 50 and 51 when the cover status detection signal having the "ON" state is output, or when the cover status detection signal is changed from the "OFF" state to the "ON" state. Alternatively, the system controller 110 may obtain information regarding the size and/or orientation of the original document from the document detectors 50 and 51 when the document detection signal having the "ON" state and the cover status detection signal having the "ON" state are respectively output. In this example shown in FIG. 3, the first document detector 50 detects the width of the original document, while the second document detector 51 detects the length of the original document, when the original document is placed in a manner as shown in FIG. 3.

Figure 4:
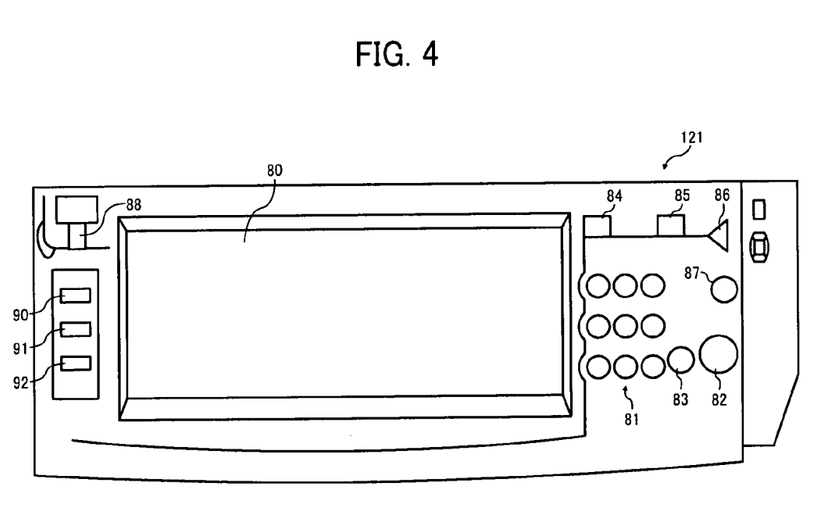
FIG. 4 is an enlarged front view illustrating a portion of an operation panel shown in FIG. 3.

Referring now to FIG. 4, the structure and function of the operation panel 121 are explained according to an example embodiment of the present invention. The operation panel 121 may receive a user input, and outputs a user input signal to an operation panel controller 115 (FIG. 5) of the system controller 110. Alternatively, the operation panel 121 may output various information under control of the operation panel controller 115 of the system controller 110, for example, in response to the user input. As shown in FIG. 4, the operation panel 121 includes a display 80 provided in a central section of the operation panel 121. In this example, the display 80, which is capable of displaying various information, is implemented by a liquid crystal display (LCD) integrated with a touch panel. The touch panel may allow the user to make the selection or instruction according to the contents of the screen displayed by the LCD. The selection or instruction made by the user is sent to the operation panel controller 115 as the user input signal.

The operation panel 121 additionally includes various kinds of keys including a ten key 81, a start key 82, a clear/stop key 83, a program key 84, a reset/save mode key 85, an interrupt key 86, a cover sheet key 87, a setting key 88, a document box key 90, a fax key 91, and a scan to mail key 92. The selection of any key made by the user is sent to the operation panel controller 115 as the user input signal.

The ten key 81 allows the user to input numerical data, such as the number of original documents to be read by the image reading device 22.

In one example, the start key 82 allows the user to input a user instruction for starting image reading. When the start key 82 is selected, the operation panel 121 outputs the user input signal indicating that the user instruction for image reading is received. Upon detecting the user input signal, the operation panel controller 115 causes the image reading device 22 to start image reading. For the descriptive purpose, in this specification, the user input signal indicating that the user instruction for image reading is received may be referred to as an image reading start signal.

The clear/stop key 83 allows the user to cancel the user instruction previously input or stop the operation currently performed by the image reading device 22. The program key 84 allows the user to recall the user instruction previously stored in the memory of the image reading device 22. The reset/save mode key 85 allows the user to reset the user instruction previously input to return to the default settings or change the mode of the image reading device 22 between the normal mode and the energy save mode. The interrupt key 86 allows the user to interrupt the operation currently performed by the image reading device 22. The cover sheet key 87 allows the user to attach a cover sheet, for example, when sending image data read from an original document to any desired destination via facsimile.

The setting key 88 allows the user to input various settings or change the default settings according to user preference. For example, when the setting key 88 is selected, the display 80 may display various information related to image reading such as the size or the sheet type of the original document to be read, a default destination to which the image data is sent or stored after reading the original document into the image data, etc.

The document box key 90, the fax key 91, and the scan to mail key 92 may be provided, each of which allows the user to select one of the functions provided by the image reading device 22. When selected, the document box key 90 causes the display 80 to display various information related to the function of reading an original document into image data, and storing the image data in the image reading device 22 or any desired storage device that is available for use. When selected, the fax key 91 causes the display 80 to display various kinds of information related to the function of faxing image data to any desired destination. When selected, the scan to mail key 92 causes the display 80 to display various kinds of information related to the function of reading an original document into image data, and sending the image data to any desired email address through the communication device.

Referring now to FIG. 5, function of controlling the light source according to the user activity being performed on the image reading apparatus 100 of FIG. 1, provided by the system controller 110 of the image reading device 22, is explained according to an example embodiment of the present invention. As described above referring to FIG. 1, under control of the system controller 110, the image reading device 22 causes the light source, such as the first light 18 of the ADF 20 and/or the second light 23a of the image reading device 22, to turn on when the user activity is assumed to ultimately cause the image reading device 22 to start image reading operation. In this example, it is assumed that, when the user activity that is assumed to ultimately cause image reading is performed on the image reading apparatus 100, a user activity signal is most likely to be generated in the image reading apparatus 100. In order to determine whether the user activity being performed will ultimately cause image reading, the system controller 110 determines whether any user activity signal having a predetermined state is output. Examples of user activity signal are explained below with reference to FIG. 5.

In one example, the document set detection signal output by the document set detector 117 may be used as the user activity signal. As described above referring to FIG. 1, the document set detector 117 outputs the document set detection signal having the "OFF" state when no original document is determined to be placed on the document tray 5, and the document set detection signal having the "ON" state when the original document is determined to be placed on the document tray 5. Since the user is most likely to place the original document on the document tray 5 before instructing the image reading device 22 to start reading the original document into image data, the document set detection signal may be used as the user activity signal. For example, when the document set detection signal having the "ON" state is output, or when the document set detection signal is changed from the "OFF" state to the "ON" state, the system controller 110 may determine that the user activity that is assumed to ultimately cause image reading has been performed.

In another example, the cover status detection signal output by the cover status detector 52 may be used as the user activity signal. As described above referring to FIG. 3, the cover status detector 52 outputs the cover status detection signal having the "OFF" state when the ADF 20 is open, and the cover status detection signal having the "ON" state when the ADF 20 is closed. Since the user is most likely to open the ADF 20 to place the original document on the exposure glass 21 and close the ADF 20 after placing the original document on the exposure glass 21 before instructing the image reading device 22 to start reading the original document into image data, the cover status detection signal may be used as the user activity signal. For example, when the cover status detection signal is changed from the "OFF" state to the "ON" state, the system controller 110 may determine that the user activity that is assumed to ultimately cause image reading has been performed.

In another example, the document detection signal output by either one of the first document detector 50 and the second document detector 51 may be used as the user activity signal. As described above referring to FIG. 3, either one of the document detectors 50 and 51 outputs the document detection signal having the "OFF" state when no original document is determined to be placed on the exposure glass 21, and the document detection signal having the "ON" state when the original document is determined to be placed on the exposure glass 21. Since the user is most likely to place the original document on the exposure glass 21 before instructing the image reading device 22 to start reading the original document into image data, the document detection signal may be used as the user activity signal. For example, when the document detection signal having the "ON" state is output, or when the document detection signal is changed from the "OFF" state to the "ON" state, the system controller 110 may determine that the user activity that is assumed to ultimately cause image reading has been performed.

In another example, the user input signal output by the operation panel 121 may be used as the user activity signal, only if the user input signal is assumed to ultimately cause image reading. Since the user is most likely to select one of the keys shown in FIG. 4 that relates to image reading before instructing the image reading device 22 to start reading the original document into image data, the user input signal related to image reading may be used as the user activity signal.

In one example, referring back to FIG. 4, before the user selects the start key 82 to instruct the image reading device 22 to start image reading, the user may select the ten key 81 to input the number of original document sheets to be read. In another example, the user may select the program key 84 to recall the user instruction previously stored, before selecting the start key 82. In another example, the user may select the reset/save mode key 85 to change the mode of the image reading device 22 from the energy save mode to the normal mode to prepare for image reading, before selecting the start key 82. In another example, the user may select the cover sheet key 87 to prepare the cover sheet to be attached with the image data to be read from the original document, before selecting the start key 82. In another example, the user may select the setting key 88 to confirm the default settings or change the default settings, before selecting the start key 82. In another example, the user may select one of the document box key 90, the fax key 91, and the scan to mail key 92 to specify the function to be performed, before selecting the start key 82.

When any one of the above-described keys or any other kind of key related to image reading is selected and the user input signal indicating such selection made by the user is output, the system controller 110 may determine that the user activity that is assumed to ultimately cause image reading has been performed.

In this example, the system controller 110 may interpret the image reading start signal as the user activity signal, as the image reading start signal will cause image reading operation. Alternatively, the image reading start signal may be interpreted differently from the user input signal related to image reading. When the image reading start signal and the user input signal related to image reading are interpreted differently, the system controller 110 may determine whether any user input signal related to image reading is output before the image reading start signal is output. In either case, the user input signal output by the operation panel 121 may be input to the light source controller 113 directly or via the operation panel controller 115.

In another example, any combination of the above-described signals may be used as the user activity signal. In, one example, the cover status detection signal and the document detection signal may be used as the user activity signal. For example, when the user slightly opens the ADF 20 to place the original document on the exposure glass 21 or remove the original document from the exposure glass 21, the cover status detector 52 may not be able to detect opening of the ADF 20 as it is most likely to be located near the rotation center axis of the ADF 20. In such case, at least one of the first document detector 50 and the second document detector 51 may be able to detect whether the original document is placed on the exposure glass 21. Further, the first document detector 50, which is preferably located away from the rotation center axis of the ADF 20, may be able to detect opening of the ADF 20. In order to improve the detection accuracy, the system controller 110 may determine whether the user activity that is assumed to ultimately cause image reading has been performed based on the cover status detection signal and the document detection signal. For example, when the cover status detection signal having the "ON" state and the document detection signal having the "ON" state are respectively output, the system controller 110 may determine that the user activity that is assumed to ultimately cause image reading has been performed. When either one of the cover status detection signal and the document detection signal has the "OFF" state, the system controller 110 may determine that the user activity that is assumed to ultimately cause image reading has not been performed.

Still referring to FIG. 5, the system controller 110 includes a light source controller 113, the operation panel controller 115, and a timer 122.

The light source controller 113 monitors the power of the light source, such as the first light 18 and/or the second light 23a, to determine whether the power of the light source is turned on or off. The light source controller 113 controls the power of the first light 18 and/or the second light 23a according to the user activity signal. In one example, the light source controller 113 changes the power of the first light 18 and/or the second light 23a from the off state to the on state when the user activity that is assumed to ultimately cause image reading has been performed. In order to determine whether such user activity has been performed, the light source controller 113 may determine whether the user activity signal having a predetermined state, which is most likely to be generated when such user activity has been performed, is output. In another example, the light source controller 113 changes the power of the first light 18 and/or the second light 23a from the on state to the off state when the user activity that is assumed to ultimately cause canceling of image reading has been performed. In order to determine whether such user activity has been performed, the light source controller 113 may determine whether the user activity signal having a predetermined state, which is most likely to be generated when such user activity has been performed, is output.

The operation panel controller 115 controls information input by the user via the operation panel 121 or information output to the user via the operation panel 121. In this example, the operation panel controller 115 may control the power of the first light 18 and/or the second light 23a according to the image reading start signal. When the operation panel 121 outputs the image reading start signal indicating that the start key 82 of FIG. 4 is selected, the operation panel controller 115 may cause the imaging sensor 10 or 38 to convert the light reflected from the original document 112 to the image signal. In order to start image reading, the operation panel controller 115 may firstly cause the first light 18 and/or the second light 23a to turn on when the power of the first light 18 and/or the second light 23a is turned off. Alternatively, the operation panel controller 115 may cause the first light 18 and/or the second light 23a to turn on via the light source controller 113.

The timer 122 obtains a counted timer value, which may be used by the light source controller 113.

In one example, when any one of the above-described signals is output as the user activity signal, and when the user activity signal has the predetermined state, the system controller 110 may interpret that the user activity that is assumed to ultimately cause image reading has been performed. When the power of the first light 18 and/or the second light 23a is turned off, the light source controller 113 turns on the power of the first light 18 and/or the second light 23a. Since the power of the first light 18 and/or the second light 23a is turned on before the user instruction for starting image reading is input by the user through the operation panel 121, the first light 18 and/or the second light 23a may be ready for image reading by the time when the user instruction for starting image reading is input by the user. This may reduce the overall time that may be necessary to prepare for image reading. In this example, the system controller 100 may check the on or off state of the light source before determining whether the user activity signal indicating that such user activity has been performed is output.

In another example, when any combination of the above-described signals is output as the user activity signal, and when the user activity signal has the predetermined state, the system controller 110 may interpret that the user activity that is assumed to ultimately cause image reading has been performed. When the power of the first light 18 and/or the second light 23a is turned off, the light source controller 113 turns on the power of the first light 18 and/or the second light 23a. In this example, the system controller 100 may check the on or off state of the light source before determining whether the user activity signal indicating that such user activity has been performed is output.

As described above referring to FIG. 5, the on or off state of the light source may be controlled using any one or any combination of the signals, which may be readily available from the devices that are present in the image reading apparatus 100. In this manner, the overall time that may be necessary to prepare for image reading may be easily reduced without changing the hardware structure of the image reading apparatus 100.

Figure 6:
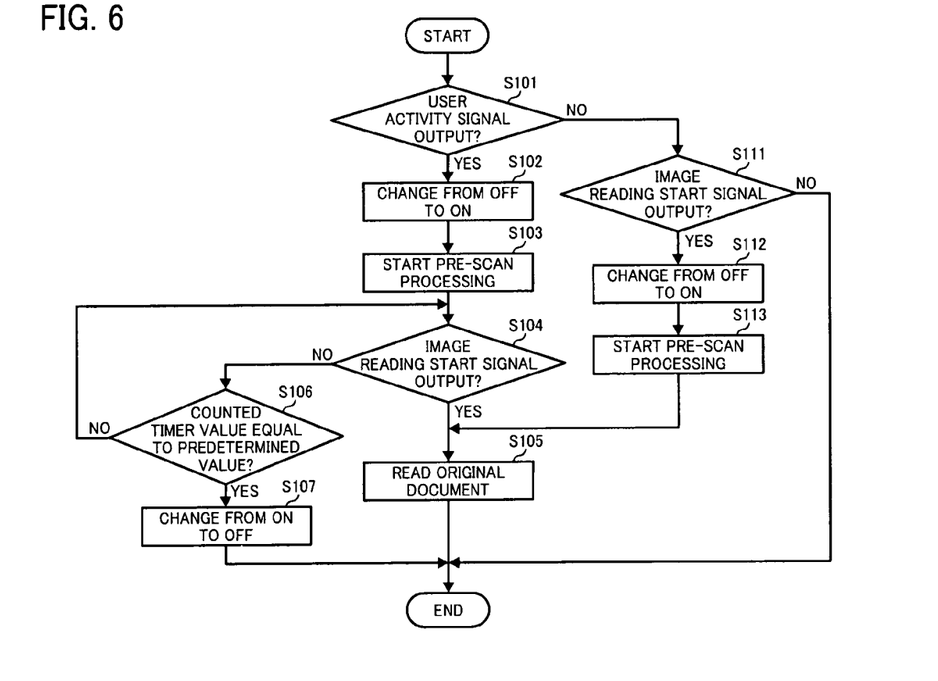
FIG. 6 is a flowchart illustrating operation of controlling a light source performed by the image reading device of FIG. 1 according to an example embodiment of the present invention.

Referring now to FIG. 6, operation of controlling the light source performed by the light source controller 113 is explained according to an example embodiment of the present invention. As described above referring to FIG. 5, a light source control program, which may be a part of the reading control program, may be provided in the memory of the system controller 110. When activated, the light source control program causes the light source controller 113 to perform the operation of FIG. 6.

The operation of FIG. 6 may be performed when the power of the image reading apparatus 100 is changed from the off state to the on state. Alternatively, the operation of FIG. 6 may be performed when the image reading apparatus 100 is changed from the energy save mode to the normal mode.

Alternatively, the operation of FIG. 6 may be performed periodically when the image reading apparatus 100 is turned on. For example, when a counted timer value counted from the time when the first light 18 and/or the second light 23a is turned off, which is obtainable from the timer 122, reaches a predetermined timer value, the light source controller 113 may perform the operation shown in FIG. 6.

Alternatively, the operation of FIG. 6 may be performed periodically when the image reading apparatus 100 is in the energy save mode. For example, when a counted timer value counted from the time when the image reading apparatus 100 is changed from the normal mode to the energy save mode, which is obtainable from the timer 122, reaches a predetermined timer value, the light source controller 113 may perform the operation shown in FIG. 6.

Further, before performing operation of FIG. 6, the light source controller 113 may determine whether the power of the first light 18 and/or the second light 23a is turned on. When the power of the first light 18 and/or the second light 23a is turned on, the light source controller 113 may proceed to perform S101 of FIG. 6.

Referring to FIG. 6, S101 determines whether the user activity signal having a predetermined state is output to generate a determination result. As described above referring to FIG. 5, for example, the user activity signal having the predetermined state may correspond to any one or any combination of the document set detection signal having the "ON" state, the cover status detection signal having the "ON" state, the document detection signal having the "ON" state, and the user input signal related to image reading.

When the determination result of S101 indicates that the user activity signal having the predetermined state is output ("YES" at S101), the operation proceeds to S102. When the determination result of S101 indicates that the user activity signal having the predetermined state is not output ("NO" at S101), the operation proceeds to S111.

S102 causes the first light 18 and/or the second light 23a to change from the off state to the on state.

S103 causes the IPU 120 to start pre-scan processing. In one example, the light source controller 113 causes the image reading device 22 to start applying shading correction. In response to the instruction received from the light source controller 113, the drive device such as the motor 29 (FIG. 2) drives the first carriage 24 (FIG. 2) and the second carriage 27 (FIG. 2) respectively from the home position to the image reading section where the second light 23a can irradiate the reference board 33 (FIG. 2). As the second light 23a irradiates the reference board 33, a light reflected from the reference board 33 may be converted by the second imaging sensor 38 to the shading correction data, which is to be used by the shading correction circuit 40 (FIG. 5). In another example, in response to the instruction received from the light source controller 113, the second light 18 irradiates the background board to obtain a light reflected from the background board. The first imaging sensor 10 obtains the shading correction data, which is to be used by the shading correction circuit 40

(FIG. 5), from the light reflected from the background board. Since the pre-scan processing, such as shading correction, has been already started by the time when the user instruction for starting image reading is received, the overall time that may be necessary to prepare for image reading may be further reduced.

Referring back to FIG. 6, S104 determines whether the image reading start signal is output.

When the determination result of S104 indicates that the image reading start signal is output ("YES" at S104), the operation proceeds to S105. When the determination result of S104 indicates that the image reading start signal is not output ("NO" at S104), the operation proceeds to S106.

S105 causes the image reading device 22 to start image reading.

S106 determines whether the counted timer value reaches a predetermined timer value to generate a determination result. For example, when the determination result of S104 indicates that the image reading start signal is not output ("NO" at S104), the timer 122 may reset the counted timer value to 0, and start counting a time period to generate a counted timer value. When the determination result of S106 indicates that the counted timer value reaches a predetermined timer value ("YES" at S106), the operation proceeds to S107. When the determination result of S106 indicates that the counted timer value does not reach the predetermined timer value ("NO" at S106), the operation returns to S104. Thus, the image reading device 22 may repeatedly check whether the user instruction for starting image reading is received at least for the predetermined time period counted from the time when the power of the light source is changed from the off state to the on state. The predetermined timer value may be previously set by default or according to the user preference.

S107 changes the power of the first light 18 and/or the second light 23a from the on state to the off state, and the operation ends.

When the determination result of S101 indicates that the user activity signal having the predetermined state is not output ("NO" at S101), S111 determines whether the image reading start signal is output to generate a determination result. When the determination result of S111 indicates that the image reading start signal is output ("YES" at S111), the operation proceeds to S112. When the determination result of S112 indicates that the image reading start signal is not output ("NO" at S111), the operation ends.

S112 changes the power of the first light 18 and/or the second light 23a from the off state to the on state.

S113 causes the image reading device 22 to start applying pre-scan processing such as shading correction as described above referring to S103, and the operation proceeds to S105.

The operation of FIG. 6 may be performed in various other ways. For example, the steps shown in FIG. 6 may not be performed in the order described above referring to FIG. 6. In one example, S103 may be performed after S104.

In another example, S106 may not be performed. In such case, the power of the light source may be turned off after it is determined that the image reading start signal is not output at S104.

In another example, S106 may be performed differently. In this example, S106 is provided so as to turn off the power of the light source when the image reading start signal is not output at least for the predetermined time period after the power of the light source is turned on, thus conserving energy. This may be achieved, for example, by observing output of the user activity signal. For example, when the user activity signal, which indicates that a user activity that is assumed to ultimately cause cancellation of image reading has been performed on the image reading device 22 or the ADF 20, is output, the light source controller 113 may cause the power of the light source to change from the on state to the off state. For example, the user activity signal having a predetermined state may be used in replace or in addition of the counted timer value described above referring to S106.

In one example, S106 may alternatively or additionally determine whether the cover status detection signal having the "OFF" state is output or whether the cover status detection signal is changed from the "ON" state to the "OFF" state. When the cover status detection signal having the "OFF" state is output, or when the cover status detection signal is changed from the "ON" state to the "OFF" state, the light source controller 113 assumes that image reading operation will be cancelled, and causes the light source to turn off.

In another example, S106 may alternatively or additionally determine whether the document detection signal having the "OFF" state is output or whether the document detection signal is changed from the "ON" state to the "OFF" state. When the document detection signal having the "OFF" state is output, or when the document detection signal is changed from the "ON" state to the "OFF" state, the light source controller 113 assumes that image reading operation will be cancelled, and causes the light source to turn off.

In another example, S106 may alternatively or additionally determine whether the document set detection signal having the "OFF" state is output or whether the document set detection signal is changed from the "ON" state to the "OFF" state. When the document set detection signal having the "OFF" state is output or when the document set detection signal is changed from the "ON" state to the "OFF" state, the light source controller 113 assumes that image reading operation will be cancelled, and causes the light source to turn off.

In another example, S106 may alternatively or additionally determine whether the user input signal related to cancellation of image reading is output. For example, referring back to FIG. 4, when the clear/stop key 83 is selected and the user input signal indicating the selection of the clear/stop key 83 is output, the light source controller 113 determines that the user activity that is assumed to ultimately cause cancellation of image reading has been performed.

Alternatively, at S106, any combination of the document set detection signal having the "OFF" state, the cover status detection signal having the "OFF" state, the document detection signal having the "OFF" state, and the user input signal related to cancellation of image reading may be used to determine whether to turn off the light source.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

In one example, the image reading apparatus 100 of FIG. 1 may be implemented in various other ways. For example, the ADF 20 may not be provided on the top surface of the image reading device 22. In such case, a document cover is provided in replace of the ADF 20. Since the document set detector 117 is not provided, the user needs to open the document cover to place the original document onto the exposure glass 21. In such case, the cover status detector 52 monitors whether the document cover is open, and outputs the cover status detection signal indicating whether the document cover is open in a substantially similar manner as described above referring to FIG. 3. Further, at least one of the first document detector 50 and the second document detector 51 monitors whether the document cover is open, and outputs the document detection signal indicating whether the document cover is open in a substantially similar manner as described above referring to FIG. 3. As described above referring to FIG. 5, any one or any combination of the cover status detection signal, document detection signal, and user input signal may be used as the user activity signal.

Figure 7:
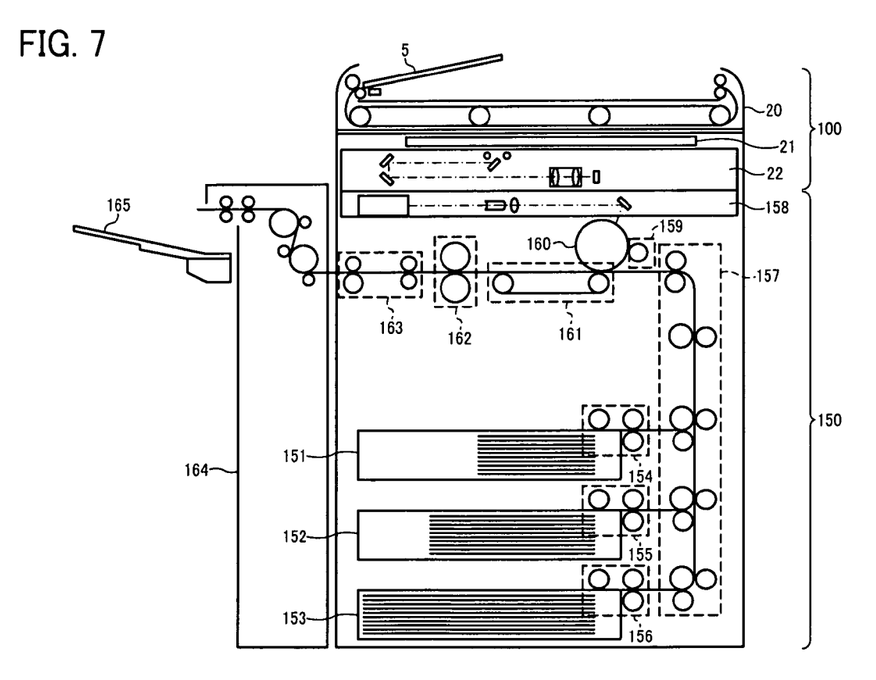
FIG. 7 is a cross-section view illustrating the structure of an image forming apparatus including the image reading device of FIG. 1 according to an example embodiment of the present invention.

In another example, the image reading device 22 of FIG. 1 may be combined with one or more devices to together function as an image forming apparatus shown in FIG. 7. The image forming apparatus of FIG. 7 is capable of forming an image, which may be read by the image reading device 22, on a recording sheet.

Referring to FIG. 7, the image forming apparatus of FIG. 7 includes the image reading apparatus 100 having the ADF 20 and the image reading device 22, and a printing apparatus 150 provided below the image reading apparatus 100.

Although not shown in FIG. 4, the image forming apparatus of FIG. 7 may be provided with an operation panel, which is substantially similar to the operation panel 121 of FIG. 4 in structure or function. In addition to the keys shown in FIG. 4, the operation panel of the image forming apparatus of FIG. 7 may include a test copy key, a copy key, and a print key, for example. The test copy key allows the user to test a printed copy. The copy key may be selected by the user to request for the function of copying an original document. The print key may be selected by the user to request for the function of printing image data, which may be stored in the image forming apparatus of FIG. 7 or provided to the image forming apparatus of FIG. 7 through the communication device or the input/output port.

Referring to FIG. 7, the printing apparatus 150 includes a first tray 151, a second tray 152, a third tray 153, a first feeder 154, a second feeder 155, a third feeder 156, a transfer device 157, a writing device 158, a developer 159, a photoconductor 160, an intermediate transfer device 161, a fixing device 162, a fourth feeder 163, a finisher 164, and an output tray 165.

In an example operation, the writing device 158 forms a latent image on the surface of the photoconductor 160 according to the image data, which is received from the image reading apparatus 100. The developer 159 develops the latent image into a toner image. The toner image is then transferred to a recording medium such as a recording sheet, which is carried by the intermediate transfer device 161. In this example, the recording medium is transferred to the intermediate transfer device 161 from any one of the first tray 151, second tray 152, and third tray 152 by the corresponding one of the first feeder 154, second feeder 155, and third feeder 156, through the transfer device 157. The recording medium having the toner image thereon is further transferred to the fixing device 162 by the intermediate transfer device 161. The fixing device 162 then fixes the toner image onto the recording medium. The recording medium is further carried by the fourth feeder 163 through the finisher 164 onto the output tray 165.

When controlling the light source according to the user activity being performed on the image forming apparatus of FIG. 7, the system controller 110 may function or operate in a substantially similar manner as described above. The differences include the type of user input signal being generated by the operation panel. For example, when the test copy key or the copy key is selected by the user, the system controller 110 may determine that the user activity signal is output, which indicates that the user activity that is assumed to ultimately cause image reading has been performed.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image reading apparatus, comprising:
a light source configured to irradiate a light to an original document when the power of the light source is in an on state;
an imaging device configured to convert a light reflected from the original document to an image signal when an image reading start signal is output;
an operation controller coupled to the imaging device and configured to change the power of the light source from an off state to the on state when the image reading start signal is output;
a light source controller coupled to the light source and configured to change the power of the light source from the off state to the on state when a user activity signal having a first state is output, the user activity signal having the first state being assumed to be output when a user activity, other than an instruction to begin scanning, that is assumed to ultimately cause output of the image reading start signal has been performed on the image reading apparatus; and
an operation input device coupled to the operation controller and configured to receive a first user input providing information related to image reading, and output a first user input signal having the information related to image reading provided by the first user input, wherein
the light source controller is configured to interpret the first user input signal as the user activity signal having the first state,
the operation input device is further configured to receive a user input instructing the image reading apparatus to start image reading, and output the image reading start signal, and
the power of the light source is changed from the off state to the on state when the light source controller determines that the first user input signal is output before the image reading start signal is output.

2. The image reading apparatus of claim 1, further comprising:
a timer configured to obtain a counted timer value indicating a time period counted from the time when the power of the light source is changed from the off state to the on state,
wherein the light source controller is further configured to determine whether the image reading start signal is output after the power of the light source is changed from the off state to the on state, and change the power of the light source from the on state to the off state when the image reading start signal is not output until the time when the counted timer value reaches a predetermined timer value.

3. The image reading apparatus of claim 1, wherein the user activity signal is at least one of a signal indicating a document is detected on the image reading apparatus, a signal indicating a cover of the image signal apparatus is in a closed position, and a signal related to an instruction input at the operation input device other than the instruction to begin scanning.

4. The image reading apparatus of claim 1, wherein the light source controller is further configured to change the power of the light source from the off state to the on state prior to starting pre-scan processing.

5. An image reading apparatus, comprising:
  a light source configured to irradiate a light to an original document when the power of the light source is in an on state;
  an imaging device configured to convert a light reflected from the original document to an image signal when an image reading start signal is output;
  an operation controller coupled to the imaging device and configured to change the power of the light source from an off state to the on state when the image reading start signal is output;
  a light source controller coupled to the light source and configured to change the power of the light source from the off state to the on state when a user activity signal having a first state is output, the user activity signal having the first state being assumed to be output when a user activity, other than an instruction to begin scanning, that is assumed to ultimately cause output of the image reading start signal has been performed on the image reading apparatus;
  an operation input device coupled to the operation controller and configured to receive a first user input providing information related to image reading, and output a first user input signal having the information related to image reading provided by the first user input;
  a document table configured to place the original document thereon;
  an original document feeder attached to a portion of the document table so as to cover the document table when closed and expose the document table when opened and configured to feed the original document to the document table,
    the original document feeder comprising:
      a document set detector configured to output, when the original document is set to the original document feeder, a first document set detection signal indicating that the original document is set to the original document feeder; and
      a cover status detector configured to output, when the original document feeder is closed, a first cover status detection signal indicating that the original document feeder is closed,
  wherein the light source controller is further configured to interpret the first user input signal as the user activity signal having the first state, and
  wherein the light source controller is configured to interpret at least one or any combination of the first user input signal, the first document set detection signal, and the first cover status detection signal as the user activity signal having the first state.

6. The image reading apparatus of claim 5, further comprising:
  a document detector provided below the document table and configured to output, when the original document is provided on the document table, a first document detection signal indicating that the original document is provided on the document table,
  wherein the light source controller is configured to interpret at least one or any combination of the first user input signal, the first document set detection signal, the first cover status detection signal, and the first document detection signal as the user activity signal having the first state.

7. The image reading apparatus of claim 6,
  wherein the light source controller is further configured to determine whether a user activity signal having a second state is output, and change the power of the light source from the on state to the of state when the user activity signal having the second state is output before the image reading start signal is output, and
  wherein the user activity signal having the second state is assumed to be output when a user activity that is assumed to ultimately cause cancellation of the image reading start signal has been performed.

8. The image reading apparatus of claim 7, wherein the user activity signal having the second state is at least one of or any combination of:
  a second user input signal being output by the operation input device when the operation input device receives a user input instructing cancellation of image reading;
  a second document set detection signal being output by the document set detector, which indicates that the original document is not set to the original document feeder;
  a second cover status detection signal being output by the cover status detector, which indicates that the original document feeder is open; and
  a second document detection signal being output by the document detector, which indicates that the original document is not provided on the document table.

9. The image reading apparatus of claim 8, wherein the document detector is provided at a location away from the rotation center axis of the original document feeder.

10. The image reading apparatus of claim 5, wherein the light source controller is further configured to change the power of the light source from the off state to the on state prior to starting pre-scan processing.

11. An image reading apparatus, comprising:
  a light source configured to irradiate a light to an original document when the power of the light source is in an on state;
  an imaging device configured to convert a light reflected from the original document to an image signal when an image reading start signal is output;
  an operation controller coupled to the imaging device and configured to change the power of the light source from an off state to the on state when the image reading start signal is output;
  a light source controller coupled to the light source and configured to change the power of the light source from the off state to the on state when a user activity signal having a first state is output, the user activity signal having the first state being assumed to be output when a user activity, other than an instruction to begin scanning, that is assumed to ultimately cause output of the image reading start signal has been performed on the image reading apparatus;
  an operation input device coupled to the operation controller and configured to receive a first user input providing information related to image reading, and output a first user input signal having the information related to image reading provided by the first user input;
  a document table configured to place the original document thereon;

a document cover attached to a portion of the document table and configured to cover the document table when closed and expose the document table when opened; and a cover status detector configured to output, when the document cover is closed, a first cover status detection signal indicating that the document cover is closed, wherein the light source controller is configured to interpret the first user input signal as the user activity signal having the first state, and wherein the light source controller is configured to interpret at least one or any combination of the first user input signal and the first cover status detection signal as the user activity signal having the first state.

12. The image reading apparatus of claim 11, further comprising:

a document detector provided below the document table and configured to output, when the original document is provided on the document table, a first document detection signal indicating that the original document is provided on the document table, wherein the light source controller is configured to interpret at least one or any combination of the first user input signal, the first cover status detection signal, and the first document detection signal as the user activity signal having the first state.

13. The image reading apparatus of claim 12, wherein the light source controller is further configured to determine whether a user activity signal having a second state is output, and change the power of the light source from the on state to the off state when the user activity signal having the second state is output before the image reading start signal is output, and wherein the user activity signal having the second state is assumed to be output when a user activity that is assumed to ultimately cause cancellation of the image reading start signal has been performed.

14. The image reading apparatus of claim 11, wherein the light source controller is further configured to change the power of the light source from the off state to the on state prior to starting pre-scan processing.

15. A method of controlling a light source of an image reading apparatus, the method comprising:

irradiating a light to an original document when the power of the light source is in an on state;

converting a light reflected from the original document to an image signal when an image reading start signal is output;

changing the power of the light source from an off state to the on state when the image reading start signal is output;

changing the power of the light source from the off state to the on state when a user activity signal having a first state is output, the user activity signal having the first state being assumed to be output when a user activity, other than an instruction to begin scanning, that is assumed to ultimately cause output of the image reading start signal has been performed on the image reading apparatus;

providing an operation input device to receive a first user input providing information related to image reading, and to output a first user input signal having the information related to image reading provided by the first user input;

providing a document table to place the original document thereon;

providing an original document feeder to cover the document table when closed and expose the document table when opened and to feed the original document to the document table;

providing a document set detector to output a first document set detection signal indicating that the original document is set to the original document feeder;

providing a cover status detector to output a first cover status detection signal indicating that the original document feeder is closed;

providing a document detector to output a first document detection signal indicating that the original document is provided on the document table;

wherein the user activity signal having the first state is at least one or any combination of:

the first user input signal;

the first document set detection signal;

the first cover status detection signal; and the first document detection signal;

determining whether a user activity signal having a second state is output, the user activity signal having the second state being assumed to be output when a user activity that is assumed to ultimately cause cancellation of the image reading start signal has been performed on the image reading apparatus; and changing the power of the light source from the on state to the off state when the user activity signal having the second state is output.

16. The method of claim 15, further comprising:

applying pre-scan processing to the image signal when the user activity signal having the first state is output.

17. The method of claim 15, wherein the user activity signal having the second state is at least one or any combination of:

a second user input signal being output by the operation input device when the operation input device receives a user input instructing cancellation of image reading;

a second document set detection signal being output by the document set detector, which indicates that the original document is not set to the original document feeder;

a second cover status detection signal being output by the cover status detector, which indicates that the original document feeder is open; and a second document detection signal being output by the document detector, which indicates that the original document is not provided on the document table.

18. The method of claim 15, further comprising changing the power of the light source from the off state to the on state prior to starting pre-scan processing.

19. An image forming apparatus, comprising:

a light source configured to irradiate a light to an original document when the power of the light source is in an on state;

an imaging device configured to convert a light reflected from the original document to an image signal when an image reading start signal is output;

a printing device coupled to the imaging device and configured to form an image on a recording sheet according to the image signal;

an operation controller coupled to the light source and configured to change the power of the light source from an off state to the on state when the image reading start signal is output;

a light source controller coupled to the light source and configured to change the power of the light source from the off state to the on state when a user activity signal having a first state is output, the user activity signal having the first state being assumed to be output when a user activity, other than an instruction to begin scanning, that is assumed to ultimately cause output of the image reading start signal has been performed on the image reading apparatus;

an operation input device coupled to the operation controller and configured to receive a first user input providing information related to image reading, and output a first user input signal having the information related to image reading provided by the first user input, wherein the light source controller is configured to interpret the first user input signal as the user activity signal having the first state, the operation input device is further configured to receive a user input instructing the image reading apparatus to start image reading, and output the image reading start signal, and the power of the light source is changed from the off state to the on state when the light source controller determines that the first user input signal is output before the image reading start signal is output.

20. The image forming apparatus of claim 19, wherein the light source controller is further configured to change the power of the light source from the off state to the on state prior to starting pre-scan processing.

* * * * *